(12) United States Patent
Deng

(10) Patent No.: US 7,756,414 B2
(45) Date of Patent: Jul. 13, 2010

(54) IMAGE CAPTURING APPARATUS WITH POP-UP FLASH STRUCTURE

(75) Inventor: Hai-Tao Deng, Foshan (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 265 days.

(21) Appl. No.: 11/933,959

(22) Filed: Nov. 1, 2007

(65) Prior Publication Data

US 2008/0310832 A1 Dec. 18, 2008

(30) Foreign Application Priority Data

Jun. 13, 2007 (CN) .................. 2007 1 0200814

(51) Int. Cl.
*G03B 15/03* (2006.01)
(52) U.S. Cl. ..................................... 396/177
(58) Field of Classification Search ......... 396/176–178, 396/179; D16/209, 239
See application file for complete search history.

(56) References Cited

U.S. PATENT DOCUMENTS

| 5,233,378 | A | * | 8/1993 | Hosokawa et al. | 396/177 |
| 5,270,757 | A | * | 12/1993 | Tosaka et al. | 396/177 |
| 5,287,135 | A | * | 2/1994 | Arai et al. | 396/174 |
| 5,999,750 | A | * | 12/1999 | Yamada et al. | 396/176 |
| 6,285,833 | B1 | * | 9/2001 | Yamane | 396/177 |
| 6,510,286 | B1 | * | 1/2003 | Terada et al. | 396/177 |
| 2002/0001467 | A1 | * | 1/2002 | Tanaka et al. | 396/177 |
| 2004/0071459 | A1 | * | 4/2004 | Ujikane et al. | 396/178 |
| 2005/0175333 | A1 | * | 8/2005 | Yamada | 396/177 |
| 2005/0200745 | A1 | * | 9/2005 | Lee | 348/371 |
| 2006/0153559 | A1 | * | 7/2006 | Kim | 396/177 |
| 2009/0142047 | A1 | * | 6/2009 | Nishikawa | 396/155 |

FOREIGN PATENT DOCUMENTS

CN 1773363 A 5/2006

* cited by examiner

*Primary Examiner*—W. B. Perkey
*Assistant Examiner*—Warren K Fenwick
(74) *Attorney, Agent, or Firm*—Jeffrey T. Knapp

(57) ABSTRACT

An image capturing apparatus includes a pop-up flash. Pop-up flash includes a flash housing configured for receiving a flash therein, a drive lever and a locking lever. Flash housing is pivoted on image capturing apparatus, and moves between a first position and a second position relative to image capturing apparatus. Flash housing includes at least one positioning hole. Drive lever moves between a third position and a fourth position relative to image capturing apparatus. Locking lever abuts against drive lever. At least one locking protrusion perpendicularly extends upward from a longitudinal side thereof. When drive lever is at third position, at least one locking protrusion engages with at least one positioning hole to lock flash housing at first position; while when drive lever moves from third position to fourth position, flash housing is released to second position after at least one positioning hole separated from at least one locking protrusion.

3 Claims, 5 Drawing Sheets

IMAGE CAPTURING APPARATUS WITH POP-UP FLASH STRUCTURE

BACKGROUND

1. Field of the Invention

The present invention relates to an image capturing apparatus and, particularly, to an image capturing apparatus with a pop-up flash structure.

2. Description of Related Art

In general, an image capturing apparatus, such as a camcorder, a digital still camera, or an optical camera captures still or video images of an object. The image capturing apparatus typically includes a flash device, which has a light-emitting portion to illuminate an object.

Types of flash devices include external flash, built-in flash, and pop-up flash movable between a retracted position and a raised position relative to the image capturing apparatus. In particular, in order to improve portability, a tendency is toward the use of pop-up flash devices. The pop-up flash device includes a pop-up structure and a flash unit received in the pop-up structure. The pop-up structure is linked to the image capturing apparatus by a linkage mechanism that moves the flash unit between the retracted position and the raised position.

In the conventional linkage mechanism for the pop-up structure, flexible components (e.g., torsion springs) are used to pivot the pop-up structure on the image capturing apparatus. The pop-up structure is unlocked by electrical means, such as by using a motor, and the flash structure is popped-up from the retracted position to the raised position.

However, the use of power for controlling the motor and the control circuits needed for controlling the motor increases manufacturing costs of the image capturing apparatus.

What is needed, therefore, is to provide an image capturing apparatus with a pop-up flash structure in which the above problems are eliminated or at least alleviated.

SUMMARY

In a present embodiment, a pop-up flash structure for an image capturing apparatus includes a flash housing configured for receiving a flash unit therein, a drive lever, and a locking lever. The flash housing is pivotably attached on the image capturing apparatus, and moves between a first position and a second position relative to the image capturing apparatus. The flash housing includes at least one positioning hole. The drive lever moves between a third position and a fourth position relative to the image capturing apparatus. The locking lever abuts against the drive lever, and has at least one locking protrusion perpendicularly extending upward from a longitudinal side thereof. When the drive lever is positioned at the third position, the at least one locking protrusion engages with the at least one positioning hole so as to lock the flash housing at the first position; when the drive lever moves from the third position to the fourth position, the flash housing is released to the second position after the at least one locking protrusion separating from the at least one positioning hole.

Advantages and novel features will become more apparent from the following detailed description of the present image capturing apparatus, when taken in conjunction with the accompanying drawings.

BRIEF DESCRIPTION OF THE DRAWINGS

Many aspects of the present image capturing apparatus can be better understood with reference to the following drawings. The components in the drawings are not necessarily drawn to scale, the emphasis instead being placed upon clearly illustrating the principles of the present image capturing apparatus. Moreover, in the drawings, like reference numerals designate corresponding parts throughout the several views.

DETAILED DESCRIPTION OF THE INVENTION

Figure 1:
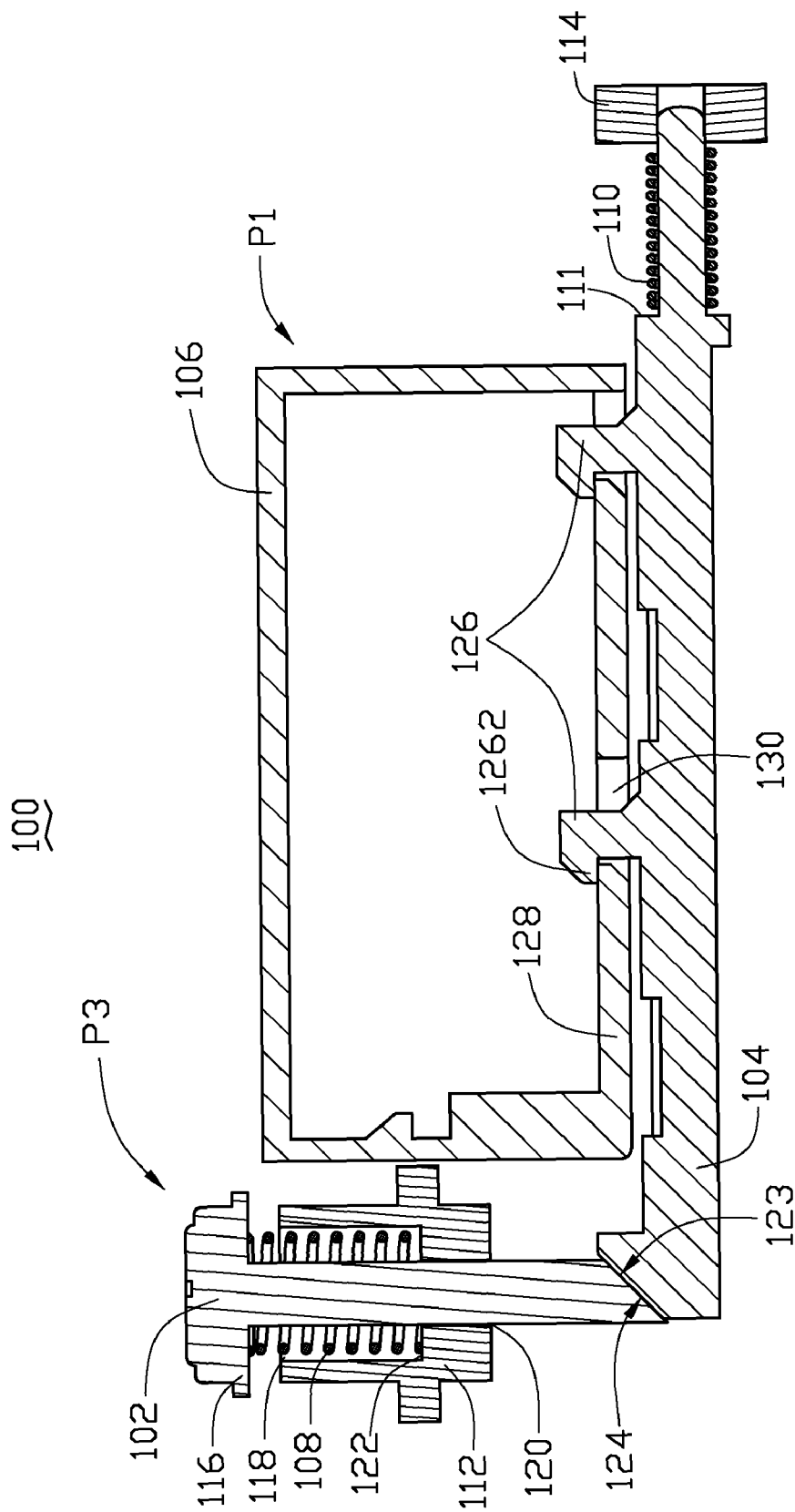
FIG. 1 is a cross-section view of a pop-up flash structure for an image capturing apparatus according to a present embodiment, showing the pop-up flash structure in a first state.

Reference will now be made to the drawings to describe at least one preferred embodiment of the present image capturing apparatus.

Referring to FIGS. 1-5, a pop-up flash structure 100 for an image capturing apparatus 200 (seen in FIG. 5), according to a present embodiment, is shown. The structure 100 includes a drive lever 102, a locking lever 104, a flash housing 106, a first elastic member 108, a second elastic member 110, a sleeve 112, and a positioning member 114. The first elastic member 108 and the second elastic member 110 may be coil springs or elastic plastic hollow cylinders.

Preferably, the drive lever 102 is positioned along a direction perpendicular to an axial direction of the locking lever 104 and can move between a third position and a fourth position relative to the apparatus 200. In this embodiment, the third position is an upper position P3 relative to the locking lever 104, and the fourth position is a lower position P4 relative to the locking lever 104. The drive lever 102 is provided with a stop portion 116 at one end of the drive lever 102 away from the locking lever 104.

The sleeve 112 has a first opening 118 and a second opening 120 respectively defined at two opposite ends thereof. A cavity (not labeled) extends through the first opening 118 and the second opening 120. A diameter of the first opening 118 is larger than that of the second opening 120. In this way, a first step portion 122 is formed on an inner wall of the sleeve 112. The first elastic member 108 is received in the first opening 118. The drive lever 102 extends through the first elastic member 108 and the sleeve 112 from the first opening 118 of the sleeve 112. As a result, one end of the first elastic member 108 is against the stop portion 116 of the drive lever 102, and another end of the first elastic member 108 is against the first step portion 122 formed inside the sleeve 112.

The locking lever 104 is against the drive lever 102. A surface 124 of the drive lever 102 contacts with a surface 123 of the locking lever 104 (seen in FIG. 1). At least one of the surface 124 of the drive lever 102 and the surface 123 of the locking lever 104 is an inclined surface. The locking lever 104 has two locking protrusions 126 perpendicularly extending upward from a longitudinal side thereof. Each of the locking protrusions 126 is provided with a locking end 1262 on the top thereof. The locking end 1262 extends from the locking protrusion 126 along a direction approximately parallel to the longitudinal side of the locking lever 104. One end of the locking lever 104 away from the drive lever 102 is extended through the second elastic member 110 and received in the positioning member 114. The end of the locking lever 104 away from the drive lever 102 is provided with a third step portion 111. The second elastic member 110 is engaged with a portion formed between the third step portion 111 and the positioning member 114. When the second elastic member 110 is compressed, one end of the second elastic member 110 is against the third step portion 111, and the other end of the second elastic member 110 is against the positioning member 114.

The housing 106 is configured for receiving a flash unit (not shown) therein, and the flash housing 106 is pivotably assembled on the apparatus 200 by two torsion springs 202 and an assembly shaft 204. The housing 106 can move between a first position, named as a retracted position P1, (shown in FIG. 1) and a second position, named as a raised position P2, (shown in FIG. 2) relative to the apparatus 200. The housing 106 includes a lower frame 128 formed on a lower portion thereof. A pair of positioning holes 130 is defined through the lower frame 128 to receive the corresponding locking protrusions 126 therein.

Initially, as shown in FIG. 1, when the drive lever 102 is at the upper position P3, the first elastic member 108 is in the free state. The two locking protrusions 126 engage with the two positioning holes 126 respectively so as to lock the housing 106 at the retracted position P1.

Figure 2:
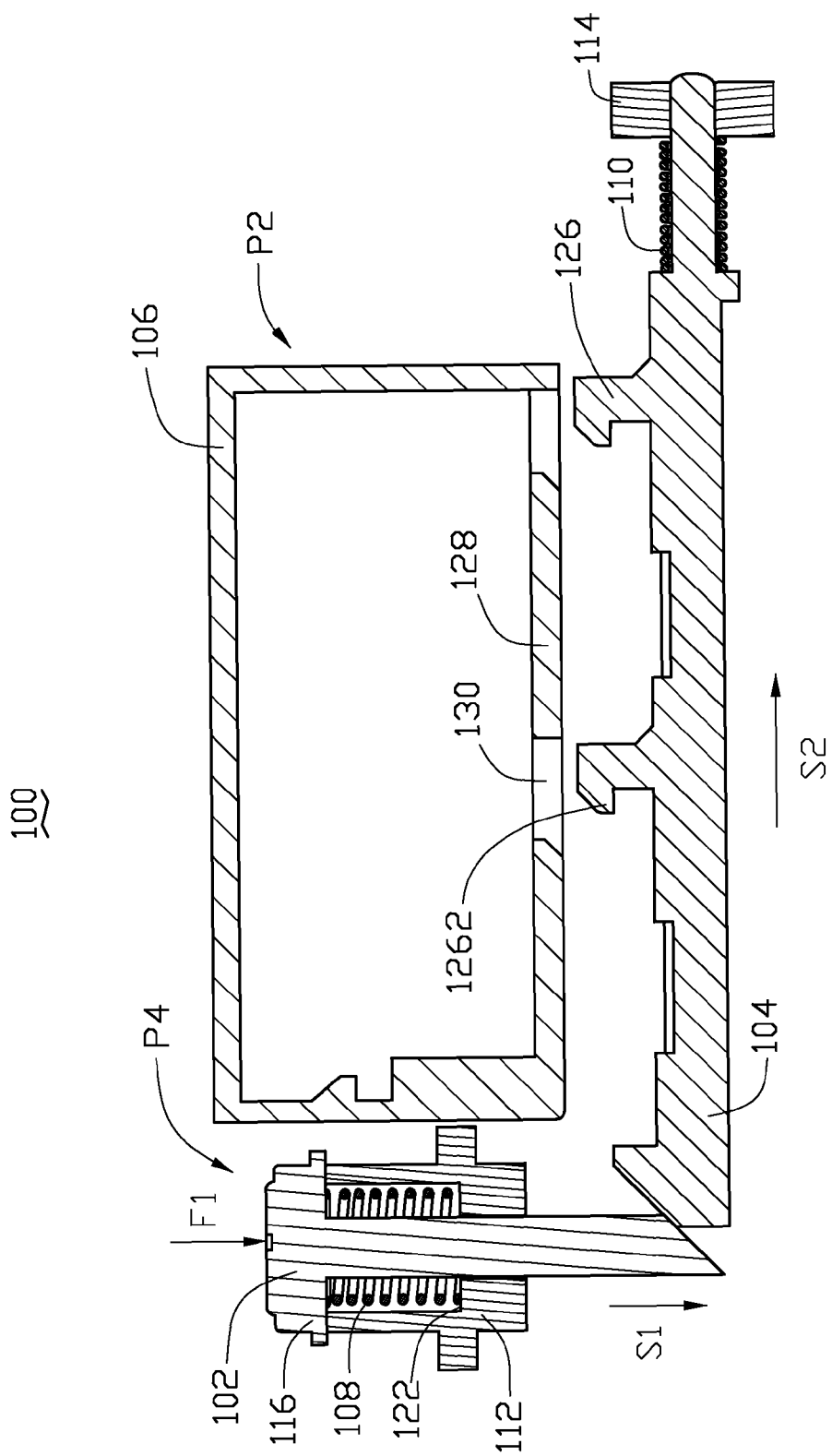
FIG. 2 is similar to FIG. 1, but showing the pop-up flash structure in a second state.

Referring to FIGS. 1 and 2, when the drive lever 102 is pressed downward by a first external force F1, the drive lever 102 moves from the upper position P3 to the lower position P4 along a direction S1 (seen in FIG. 2). During the movement, the drive lever 102 compresses the first elastic member 108 by the stop portion 116 of the drive lever 102. At the same time, the drive lever 102 also compresses the locking lever 104 to move along a linear direction S2 (seen in FIG. 2) away from the drive lever 102. The second elastic member 110 is compressed by the third step portion 111 of the locking lever 104. After a predetermined distance of movement of the locking lever 104, the locking protrusions 126 of the locking lever 104 depart from the positioning holes 130 of the housing 106. As a result, the two torsion springs 202 (seen in FIG. 5) are restored to release the housing 106 to the raised position P2 relative to the locking lever 104, and the drive lever 102 is positioned at the lower position P4.

Figure 3:
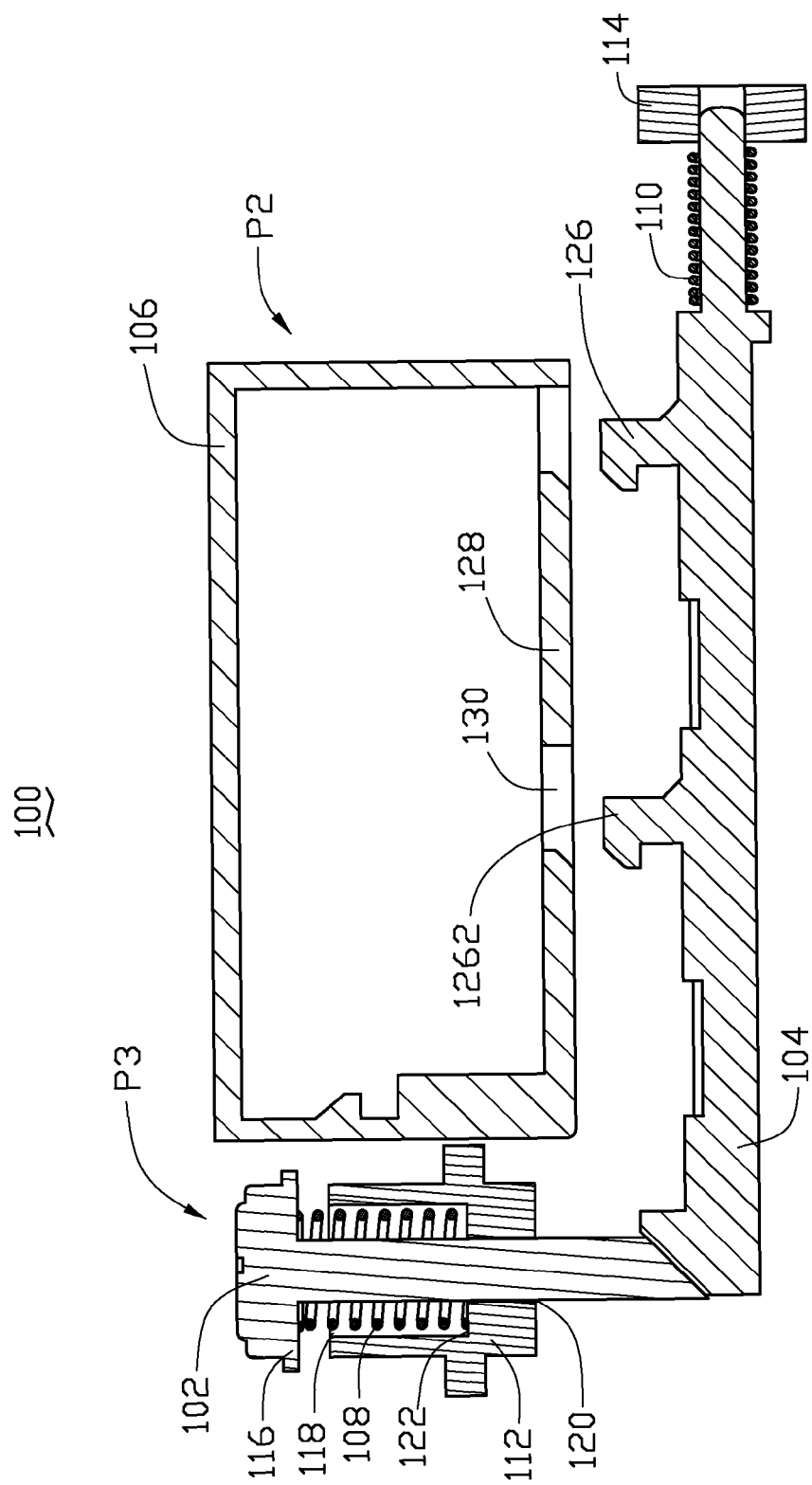
FIG. 3 is similar to FIG. 2, but showing the pop-up flash structure in a third state.

When the first external force F1 is withdrawn, the compressed first elastic member 108 is restored against the stop portion 116 of the drive lever 102 to raise the drive lever 102 to the upper position P3 from the lower position P4. The compressed second elastic member 110 is restored to move the locking lever 104. At the same time, the housing 106 is kept at the raised position P2, as shown in FIG. 3.

Figure 4:
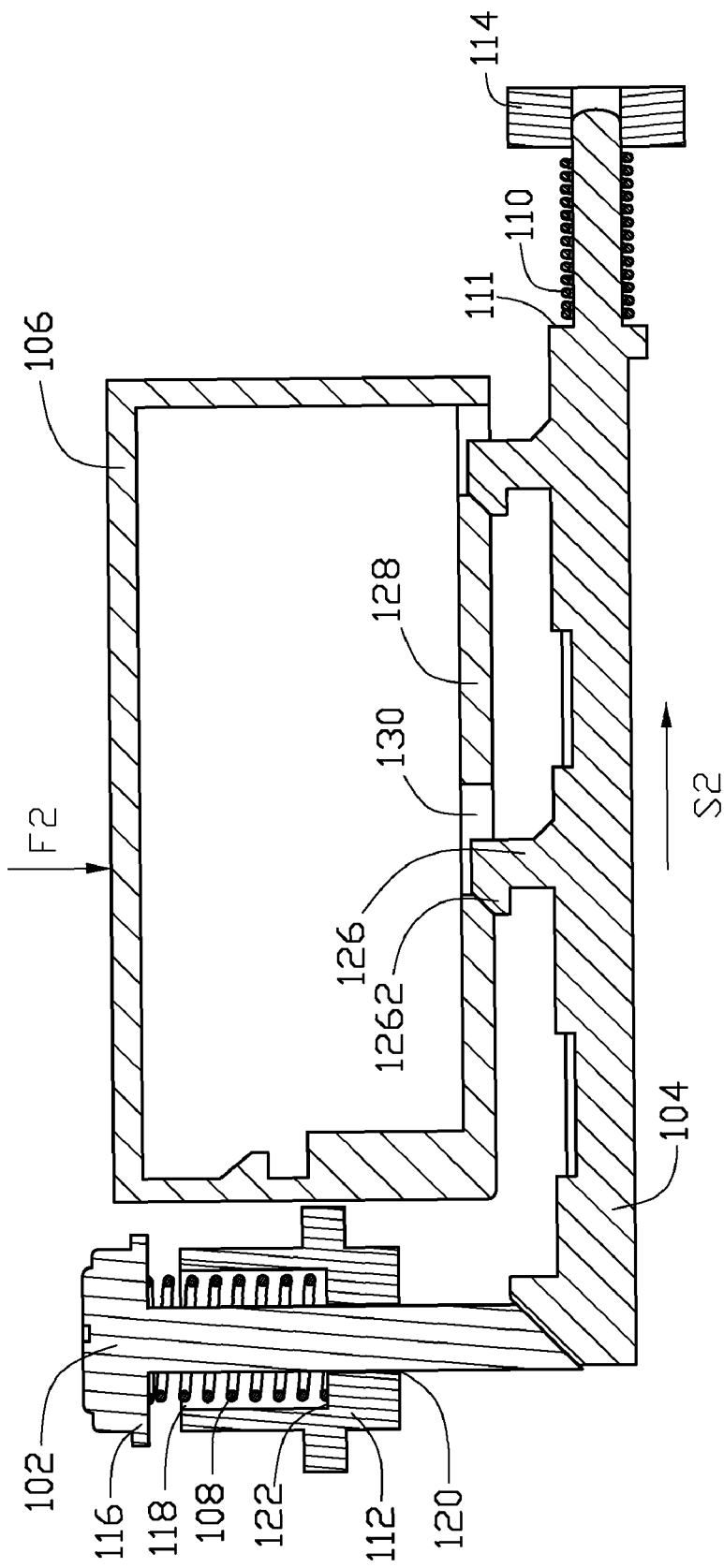
FIG. 4 is similar to FIG. 3, but showing the pop-up flash structure in a fourth state.
Figure 5:
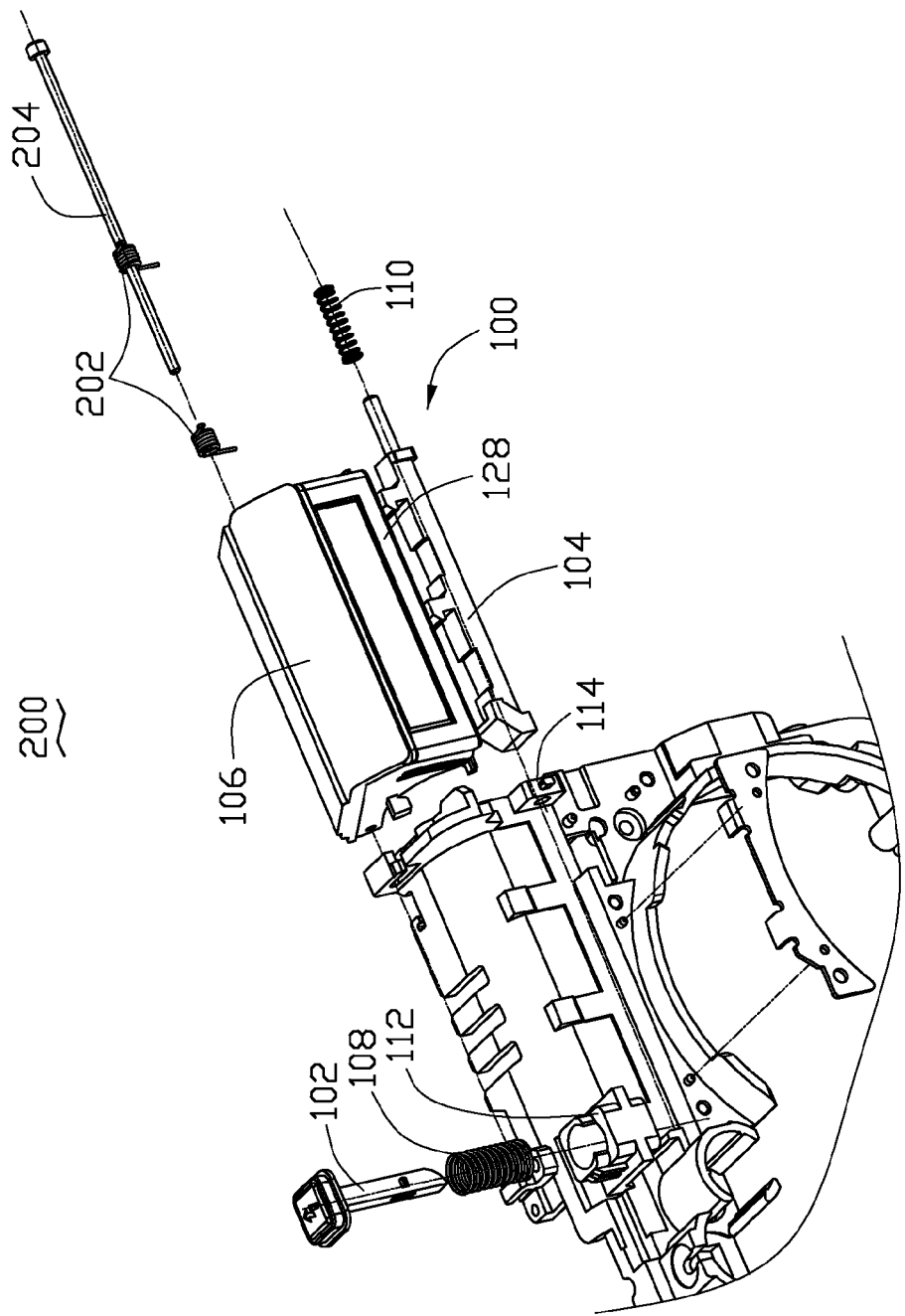
FIG. 5 is a perspective view of the pop-up flash structure, before assembling on the image capturing apparatus.

Referring to FIGS. 4 to 5, when the housing 106 is pressed downward by a second external force F2, the housing 106 rotates about the assembly shaft 204 and moves from the raised position P2 to the retracted position P1. During the movement, an inner wall of the positioning hole 130 presses the locking portions 1262 of the locking protrusions 126 to make the locking lever 104 move along the direction S2. At the same time, the second elastic member 110 is compressed by the third step portion 111 of the locking lever 104. After the above predetermined distance of movement of the locking lever 104, the compressed second elastic member 110 is restored to return the locking lever 104 to the initial position. Thus, the two locking portions 1262 of the two locking protrusions 126 are received in the two positioning holes 130, and the housing 106 is locked at the retracted position P1.

Referring to FIG. 5, the sleeve 112 and the positioning member 114 can be integrally formed on the apparatus 200, such as a camcorder, a digital still camera, or an optical camera to directly assemble the flash pop-up structure on or in the image capturing apparatus 200.

Since opening and closing of the pop-up flash structure 100 of the image capturing apparatus 200 is performed mechanically, there is no need to consume additional electrical power and use control circuits. This saves power and lowers manufacturing costs.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. An image capturing apparatus comprising:
    a flash housing configured for receiving a flash unit therein, the flash housing pivotably attached on the image capturing apparatus, and moving between a first position and a second position relative to the image capturing apparatus, the flash housing including at least one positioning hole formed thereof;
    a drive lever moving between a third position and a fourth position relative to the image capturing apparatus; and
    a locking lever abutting against the drive lever, the locking lever having at least one locking protrusion perpendicularly extending upward from a longitudinal side thereof; wherein, when the drive lever is positioned at the third position, the at least one locking protrusion engages with the at least one positioning hole so as to lock the flash housing at the first position; when the drive lever moves from the third position to the fourth position, the flash housing is released to the second position after the at least one locking protrusion moving along a linear direction away from the drive lever and separating from the at least one positioning hole;
    a first elastic member; and
    a sleeve receiving the first elastic member therein;
    wherein the sleeve has a first opening and a second opening formed at two opposite ends thereof, and a diameter of the first opening is larger than that of the second opening; the drive lever extends through the first elastic member and the first and second openings of the sleeve; when the driver lever is positioned at the fourth position the first elastic member is compressed, the first elastic member capable of restoring to return the driver lever from the fourth position to the third position.

2. The image capturing apparatus as claimed in claim 1, further comprising a second elastic member and a positioning member; wherein one end of the locking lever away from the drive lever is extended through the second elastic member and slidably received in the positioning member; when the drive lever is positioned at the fourth position, the second elastic member is compressed, when the drive lever is positioned at the third position the second elastic member restores to return the locking lever thereby allowing the at least one locking protrusion engaging with the at least one positioning hole.

3. The image capturing apparatus as claimed in claim 2, wherein the first elastic member and the second elastic member are selected from coil springs and elastic plastic hollow cylinders.

* * * * *